United States Patent [19]
Tomisawa

[11] Patent Number: 5,698,776
[45] Date of Patent: Dec. 16, 1997

[54] METHOD AND APPARATUS FOR DETECTING COMBUSTION CONDITIONS OF AN INTERNAL COMBUSTION ENGINE, AND ENGINE CONTROL METHOD USING THE DETECTION METHOD, AND ENGINE CONTROL APPARATUS USING THE DETECTION APPARATUS

[75] Inventor: Naoki Tomisawa, Atsugi, Japan

[73] Assignee: Unisia Jecs Corporation, Kanagawa-ken, Japan

[21] Appl. No.: 604,634

[22] Filed: Feb. 21, 1996

[30] Foreign Application Priority Data

Feb. 22, 1995 [JP] Japan ................ 7-033726

[51] Int. Cl.⁶ .............. F02D 45/00; F02D 45/368
[52] U.S. Cl. .............. 73/115; 73/116; 364/431.053
[58] Field of Search .............. 73/115, 116, 117.2, 73/117.3, 118.1, 119 A, 714, 756; 364/431.053; 340/439, 451

[56] References Cited

U.S. PATENT DOCUMENTS

| | | | |
|---|---|---|---|
| 4,539,841 | 9/1985 | Schroeder et al. | 73/115 |
| 4,709,678 | 12/1987 | Yagi et al. | 73/115 |
| 4,716,759 | 1/1988 | Tanaka | 73/115 |
| 4,744,243 | 5/1988 | Tanaka | 73/115 |
| 4,892,075 | 1/1990 | Iriyami et al. | 73/115 |
| 4,987,770 | 1/1991 | Nanyoshi et al. | 73/115 |
| 5,125,267 | 6/1992 | Kuroda et al. | 73/115 |
| 5,127,262 | 7/1992 | Demizu et al. | 73/115 |
| 5,229,945 | 7/1993 | Demizu et al. | 73/115 |
| 5,442,954 | 8/1995 | Fukui et al. | 73/115 |
| 5,505,077 | 4/1996 | Fukui et al. | 73/115 |

FOREIGN PATENT DOCUMENTS

| | | |
|---|---|---|
| 63-17432 | 2/1988 | Japan . |
| 4-81557 | 3/1992 | Japan . |

Primary Examiner—George M. Dombroske
Attorney, Agent, or Firm—Lowe, Price, LeBlanc & Becker

[57] ABSTRACT

Combustion pressure is detected using a cylinder pressure sensor, and a crank angle position corresponding to a centroid of combustion during a combustion period is obtained as a combustion centroid position, based on the detected combustion pressure. Combustion conditions are then detected based on the detected combustion centroid position. On the other hand, depending on operating conditions, a crank angle position corresponding to a centroid of combustion during a combustion period for the case where desired combustion conditions are obtained, is set as a target centroid position, and an engine control quantity then feedback controlled so that the combustion centroid position becomes the target centroid position. In this way, combustion conditions of an internal combustion engine can be detected to a higher accuracy than with conventional arrangements wherein combustion conditions are detected based on fluctuations in an indicated mean effective pressure and the like, which shows only a comparatively small change with changes in combustion conditions. Moreover if engine control is carried out with the combustion centroid position as an index, then engine control accuracy can be significantly improved.

12 Claims, 6 Drawing Sheets

THIS PREDETERMINED CRANK ANGLE IS SET TO THE LIMIT POINT WHERE THE COMBUSTION ENERGY Pi IS EFFECTIVELY CONVERTED TO ROTATIONAL ENERGY.→NORMALLY SET TO ATDC 15° POSITION (DURING MBT CONTROL).

HOWEVER AT THE TIME OF RETARD LIMIT CONTROL (WHEN PROMOTING CATALYST ACTIVATION) THIS IS SET WELL TO THE RETARD SIDE.

METHOD AND APPARATUS FOR DETECTING COMBUSTION CONDITIONS OF AN INTERNAL COMBUSTION ENGINE, AND ENGINE CONTROL METHOD USING THE DETECTION METHOD, AND ENGINE CONTROL APPARATUS USING THE DETECTION APPARATUS

FIELD OF THE INVENTION

The present invention relates to a method and apparatus for detecting combustion conditions of an internal combustion engine, and to an engine control method using the detection method, and an engine control apparatus using the detection apparatus. In particular, the present invention relates to improvements in technology for detecting combustion conditions of an internal combustion engine, and to improvements in methods and apparatus for internal combustion engines for controlling an engine control quantity, based on the improved detection technology.

DESCRIPTION OF THE RELATED ART

Heretofore, with engine control systems, an exhaust gas purification catalytic converter disposed in the exhaust system of an internal combustion engine is activated from an early stage after engine start-up in order to reduce the discharge amount of exhaust gas pollutants (NOx, CO, HC etc.) to the atmosphere, from an early stage after start-up.

As an example of this, there is an arrangement wherein the exhaust gas temperature is raised within a predetermined period after engine start-up, by retarding the ignition timing by a set amount, thereby effecting early activation of the exhaust gas purification catalytic converter.

However, with this conventional method, although the same retard angle amount may be applied uniformly to each cylinder of the engine, in practice the exhaust temperature (change in combustion conditions) for each cylinder relative to the ignition timing retard angle, differs for each cylinder due to the compression ratio, intake air flow rate, intake flow (eg. swirl), valve timing and the like, differing for each cylinder. Of course, since there is also inter-engine unevenness, then with a fixed retard angle amount, there will also be a similar problem with each engine, with the exhaust temperature differing for each engine.

Two problems thus arise:

(1) With a uniform retard angle amount, since this will apply to the cylinder with the worst combustion, and in avoiding this poor combustion, there will be some cylinders (or engines) wherein there is as yet a surplus retard angle up to the limit point, due to intercylinder (or inter-engine) unevenness therebetween, then the exhaust temperature cannot be effectively raised. It is however desirable to retard the ignition timing up to the limit point of the extreme retard angle where stable combustion can be maintained, so that the exhaust temperature can be effectively raised while maintaining the operability, fuel consumption, exhaust properties and the like within a predetermined range.

This problem due to inter-cylinder and inter-engine unevenness, is not limited to retard angle control of the ignition timing, but similarly occurs in the case of controlling to an ignition timing which is set to obtain desirable combustion conditions. That is to say, in spite of controlling such an ignition timing, due to inter-cylinder and inter-engine unevenness, there will be some cylinders wherein the desirable combustion conditions cannot be obtained.

(2) In order to address the problem of (1) above, there is a method where the ignition timing is retarded up to the limit point for each cylinder (each engine). With this method, for example the cylinder pressure for each cylinder (this can be for one cylinder in the case wherein inter-engine unevenness is to be eliminated) is measured, to obtain the indicated mean effective pressure (IMEP; referred to hereunder as Pi), and the limit point then detected based on changes in the Pi value.

Figure 7:
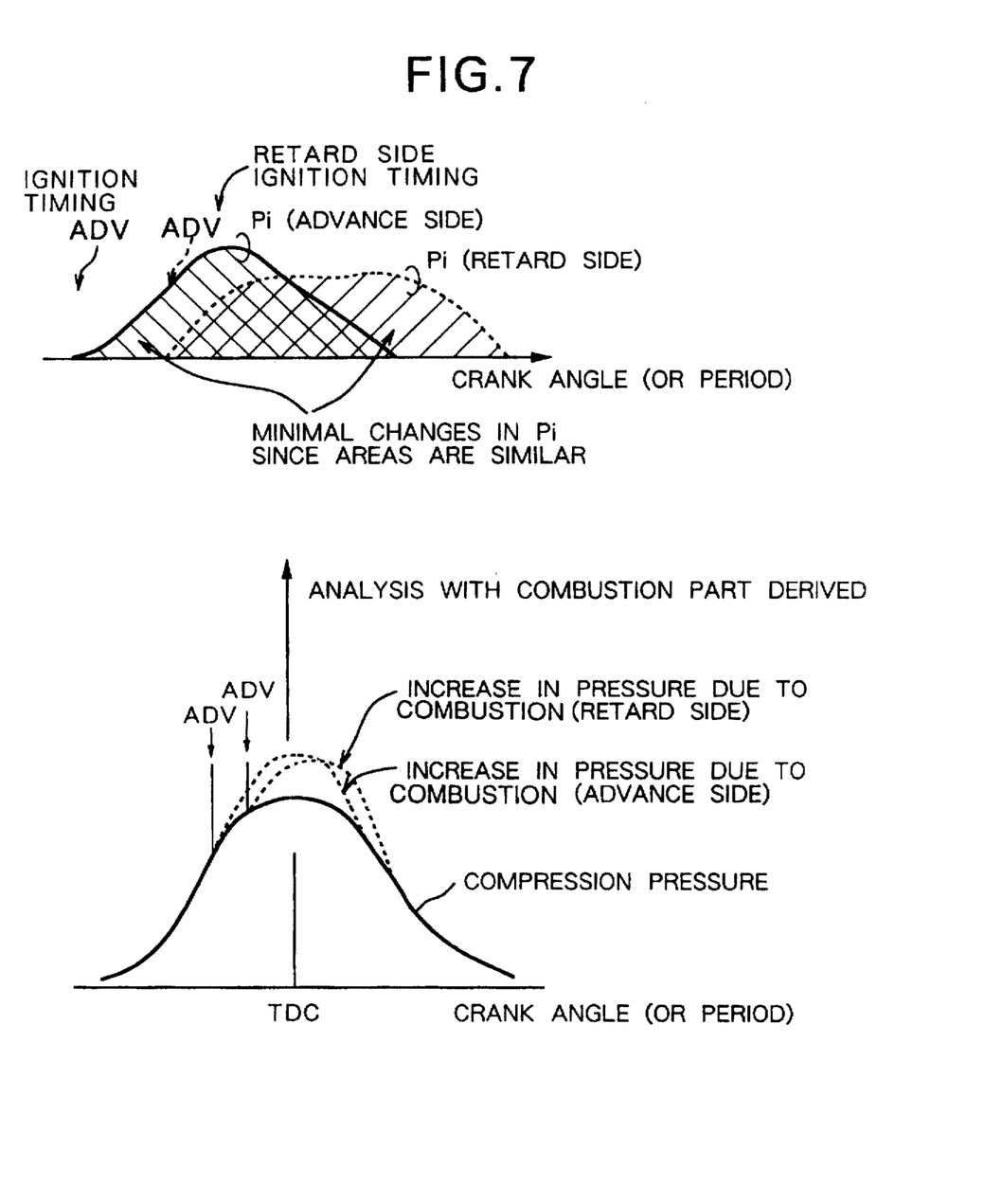
FIG. 7 is a diagram for explaining problems with conventional arrangements.

However, this Pi value is obtained from the area for the combustion pressure (cylinder pressure) over a predetermined crank angle interval, and as shown in FIG. 7, retarding of the ignition timing results in no significant corresponding change in the Pi value itself. Consequently, although changes in the Pi value may be detected, the limit point for the ignition timing retard angle cannot be detected to a high accuracy. Moreover, there is an arrangement wherein rotational fluctuations are detected, and the limit point for the engine ignition timing retard angle detected based on the results. However in this case, since the combustion conditions are not detected directly, it is not possible to accurately detect the limit point for the ignition timing retard angle.

Not only in the case of the ignition timing retard angle being detected in this way, but also in the case for example wherein the degree of combustion stability (that is to say the Pi fluctuations) is detected from the indicated mean effective pressure Pi, and the ignition timing feedback controlled so as to obtain a predetermined degree of stability, there is also the problem that since the fluctuation of the Pi value itself is small, detection accuracy is poor, and hence control accuracy is reduced.

SUMMARY OF THE INVENTION

The present invention takes into consideration the above situation with the conventional arrangements discussed under (1) and (2) above, with a first object of providing a method and apparatus for detecting combustion conditions of an internal combustion engine, which can detect the combustion conditions to a higher accuracy than with the conventional method for detecting combustion conditions based for example on Pi fluctuations. Moreover it is a second object to provide a method of (or an apparatus for) controlling an internal combustion engine which feedback controls ignition timing (although not limited to this, and may involve engine control quantities such as fuel supply quantity, fuel supply timing, EGR quantity) so as to obtain desirable combustion conditions, using the abovementioned combustion conditions detection method (or apparatus).

In addition, it is an object with the abovementioned method (or apparatus) for controlling an internal combustion engine, to raise the exhaust temperature at the time of low activation of the catalytic converter, by having combustion close to the limit point of the extreme retard angle where stable combustion can be maintained, and thereby achieve early stage activation of the exhaust gas purification catalytic converter and thus reduce the discharge of exhaust gas pollutants to a minimum. Moreover, it is an object of the present invention to significantly improve detection accuracy, control accuracy and the like, by adopting for each cylinder, the abovementioned method (or apparatus) for detecting combustion conditions of an internal combustion engine, and method (or apparatus) for controlling an internal combustion engine.

To achieve the above objects, the method and apparatus for detecting combustion conditions of an internal combustion engine includes; detecting the combustion pressure, obtaining a crank angle position corresponding to a centroid of combustion during a combustion period as a combustion centroid position, based on the detected combustion pressure, and detecting combustion conditions based on the detected combustion centroid position.

With such a construction, the combustion centroid position during the combustion period, that is to say, the centroid position of the crank angle or time interval of a change pattern during the combustion period of a value (the combustion pressure itself or indicated mean effective pressure, or a heat generation rate etc.) correlated with the combustion pressure, which changes by a comparatively large amount with respect to the change in combustion conditions, is detected and the combustion conditions detected based on the detected combustion centroid position (for example by comparing with a previously set target centroid value corresponding to a predetermined combustion condition). In this way, combustion conditions of the internal combustion engine can be detected to a higher accuracy than with the conventional arrangement wherein combustion conditions are detected based on fluctuations in the indicated mean effective pressure and the like, which shows only a comparatively small change with changes in combustion conditions. Now, the combustion centroid position is not limited to that for a single combustion cycle but may be an average of the centroid positions for several combustion cycles.

Moreover with the method and apparatus according to the present invention for controlling an internal combustion engine, the construction may include; detecting the combustion pressure, obtaining a crank angle position corresponding to a centroid of the combustion during the combustion period as a combustion centroid position, based on the detected combustion pressure, setting, depending on operating conditions, a crank angle position corresponding to a centroid of combustion during a combustion period for the case where desired combustion conditions are obtained, as a target centroid position, and feedback controlling an engine control quantity so that the combustion centroid position becomes the target centroid position.

With such a construction, since the engine control quantity is feedback controlled so that the combustion centroid position detected by the above method coincides with the target centroid position, then even if there is inter-engine unevenness, the combustion conditions of the target can be attained with high accuracy. For example, with the ignition timing retard control for early stage catalytic converter activation after engine start-up, desirable combustion conditions can be achieved by controlling the ignition timing so that the combustion energy gives the maximum exhaust energy within a predetermined stable combustion limit, while with normal ignition timing control, desirable combustion conditions can be achieved by controlling the ignition timing so that the combustion energy is effectively converted to rotation energy. If the abovementioned construction is adopted for the respective cylinders, then even if there is inter-cylinder unevenness (and of course inter-engine unevenness), the target combustion conditions can be achieved for each cylinder to a high accuracy.

Now the construction may be such that activation conditions of an exhaust gas purification catalytic converter disposed in the engine exhaust system are detected, and when a low activation condition of the catalytic converter is detected, the target centroid position is made to approach closer to a combustion stroke completion side than for normal times.

If in this way, under low activation conditions of the catalytic converter, the target centroid position is made to approach closer to the combustion stroke completion side than for normal times, combustion conditions at the time of low activation of the catalytic converter such as after start-up can be worsened to a desired amount, so that the exhaust temperature can be effectively raised. Hence activation of the catalytic converter can be effectively promoted while desirably maintaining operability and the like, so that discharge of exhaust pollutant can be kept to a minimum.

The engine control quantity may be constructed as the ignition timing.

In this case, it is possible to control to the target combustion conditions with good response and to high accuracy.

Moreover, if the construction is such that the respective methods or the respective apparatus are adopted for each cylinder, then an even greater improvement in detection accuracy, control accuracy and the like is possible.

Other aspects and objects of the present invention will become apparent from the following description of embodiments given in conjunction with the appended drawings.

DETAILED DESCRIPTION OF A PREFERRED EMBODIMENT

As follows is a description of an embodiment of the present invention.

Figure 1:
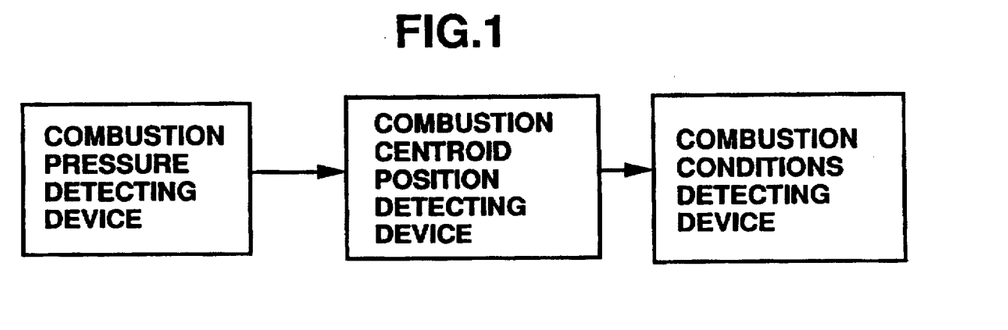
FIG. 1 is a block diagram of a basic configuration of a combustion conditions detection apparatus for an internal combustion engine according to the present invention.
Figure 2:
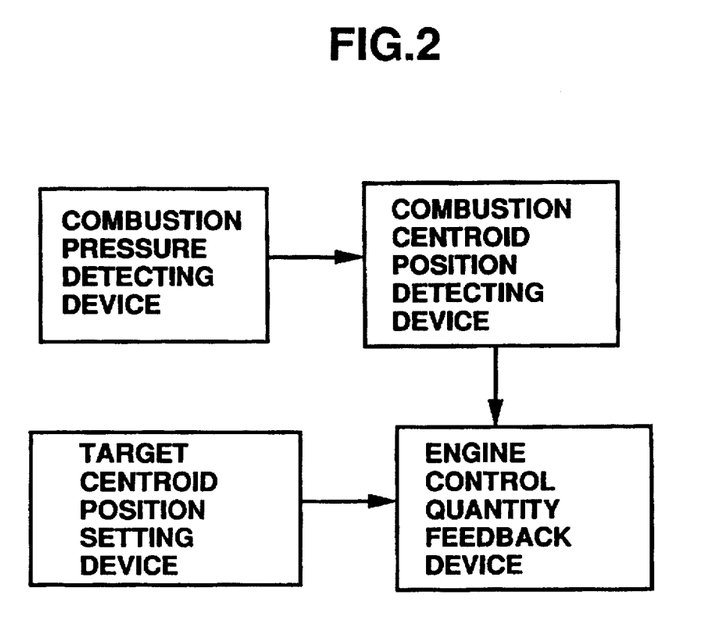
FIG. 2 is a block diagram of a basic configuration of a control apparatus for an internal combustion engine according to the present invention.
Figure 3:
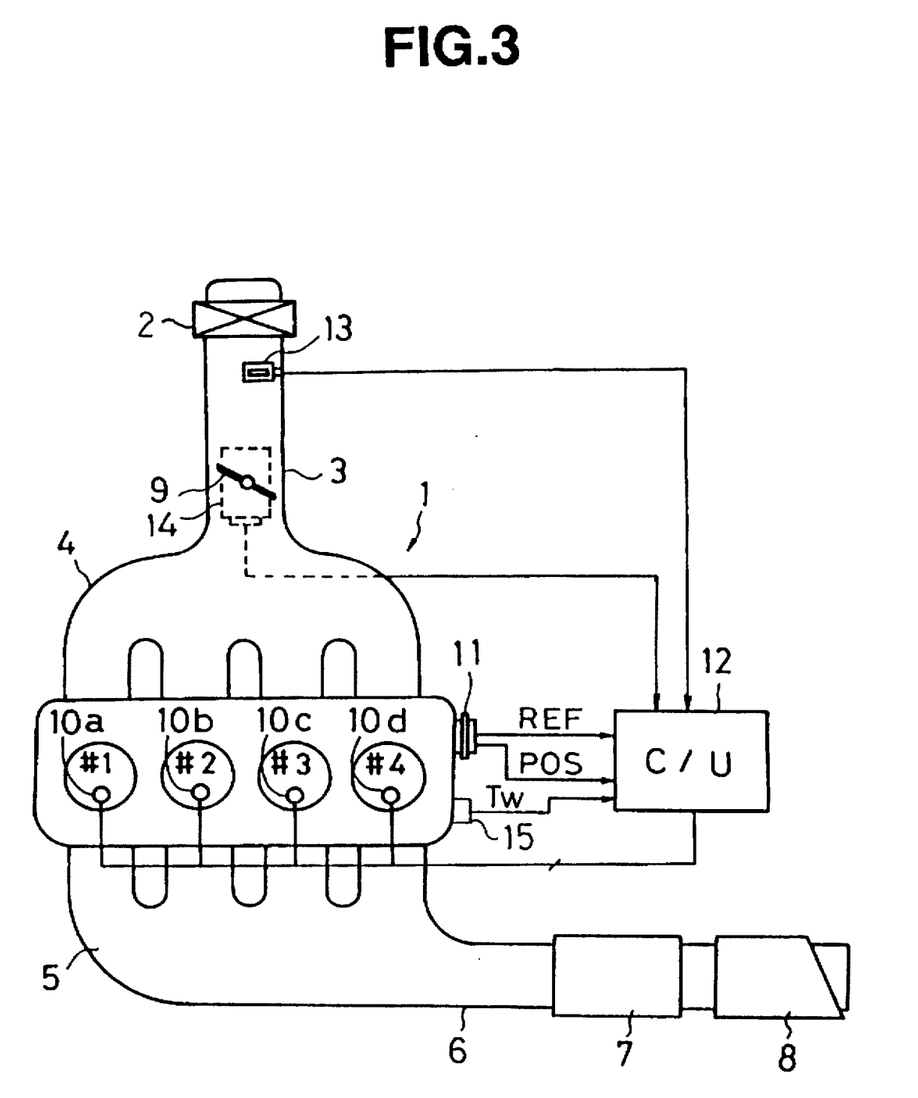
FIG. 3 is a schematic system diagram showing an embodiment of the present invention.

In FIG. 3 which is a schematic system diagram showing a basic embodiment according to the present invention of a method and apparatus for detecting combustion conditions of an internal combustion engine, or a method and apparatus for controlling an internal combustion engine, air is drawn into a four cylinder internal combustion engine 1 by way of an air cleaner 2, a throttle chamber 3, and an intake manifold 4. The combustion exhaust gases from the engine 1 are discharged to the atmosphere by way of an exhaust manifold 5, an exhaust duct 6, a three way catalytic converter 7 serving as an exhaust gas purification catalytic converter, and a muffler 8. In the present embodiment, the description involves the three way catalytic converter 7. However the embodiment is not limited to this, and may incorporate for example an oxidation catalytic converter, a lean NOx catalytic converter and the like.

A throttle valve 9 which is opened/closed through a linkage to an accelerator pedal (not shown), is provided in the throttle chamber 3, for adjusting the intake air quantity of the engine 1.

Ignition plugs (omitted from the figure) are fitted to the combustion chambers of the respective cylinders (#1 –#4) facing thereinto, while respective cylinder pressure sensors 10a–10d are provided for the ignition plugs of each cylinder.

The cylinder pressure sensors 10a–10d are a type such as disclosed in Japanese Unexamined Utility Model Publication No. 63-17432, which is fitted as an ignition plug washer. However instead of this type, a type such as disclosed in Japanese Unexamined Patent Publication No. 4-81557, wherein the sensor portion faces directly into the combustion chamber to detect cylinder pressure, may be used. When the object is to eliminate inter-engine unevenness, then the cylinder pressure sensor may be fitted to any one cylinder.

Furthermore, a crank angle sensor 11 for detecting crank angle by means of rotation of a cam shaft (not shown) is provided on the cam shaft of the engine 1.

The crank angle sensor 11 outputs a reference crank angle signal REF for each 180° crank angle (which corresponds to the stroke phase difference between cylinders in the four cylinder engine 1 of the embodiment), and outputs a unit crank angle signal POS for each unit crank angle.

The reference crank angle signal REF is for discriminating between cylinders, and may involve for example a detection signal corresponding to at least one specific cylinder, which can be distinguished from another detection signal by means of for example pulse width.

An airflow meter 13 is provided upstream of the throttle valve 9 for detecting the intake air flow rate Q of the engine 1. The throttle valve 9 is provided with a potentiometer type throttle sensor 14 for detecting the throttle valve opening TVO.

Furthermore, a water temperature sensor 15 is provided for detecting the cooling water temperature of the engine 1.

Outputs from the cylinder pressure sensors 10a–10d, the crank angle sensor 11, the air flow meter 13, the throttle sensor 14, and the water temperature sensor 15 and so on, are input to a control unit 12 provided for engine control. The control unit 12 which incorporates a microcomputer, detects operating conditions based on the input signals and controls the fuel injection quantity and fuel injection timing for the fuel injection valves (not shown in the figure), corresponding to the operating conditions, and also controls the ignition timing for the ignition plugs.

A description of the ignition timing control routine (including the combustion conditions detection control routine) carried out by the control unit 12 in the present embodiment will now be given with reference to the flow chart of FIG. 4.

With the present embodiment, the functions of the combustion pressure detecting device, the combustion centroid position detecting device, the combustion conditions detecting device, the target centroid position setting device, the engine control quantity feedback control device, and the catalytic converter activation condition detecting device are realized by software stored in the control unit 12.

Figure 4:
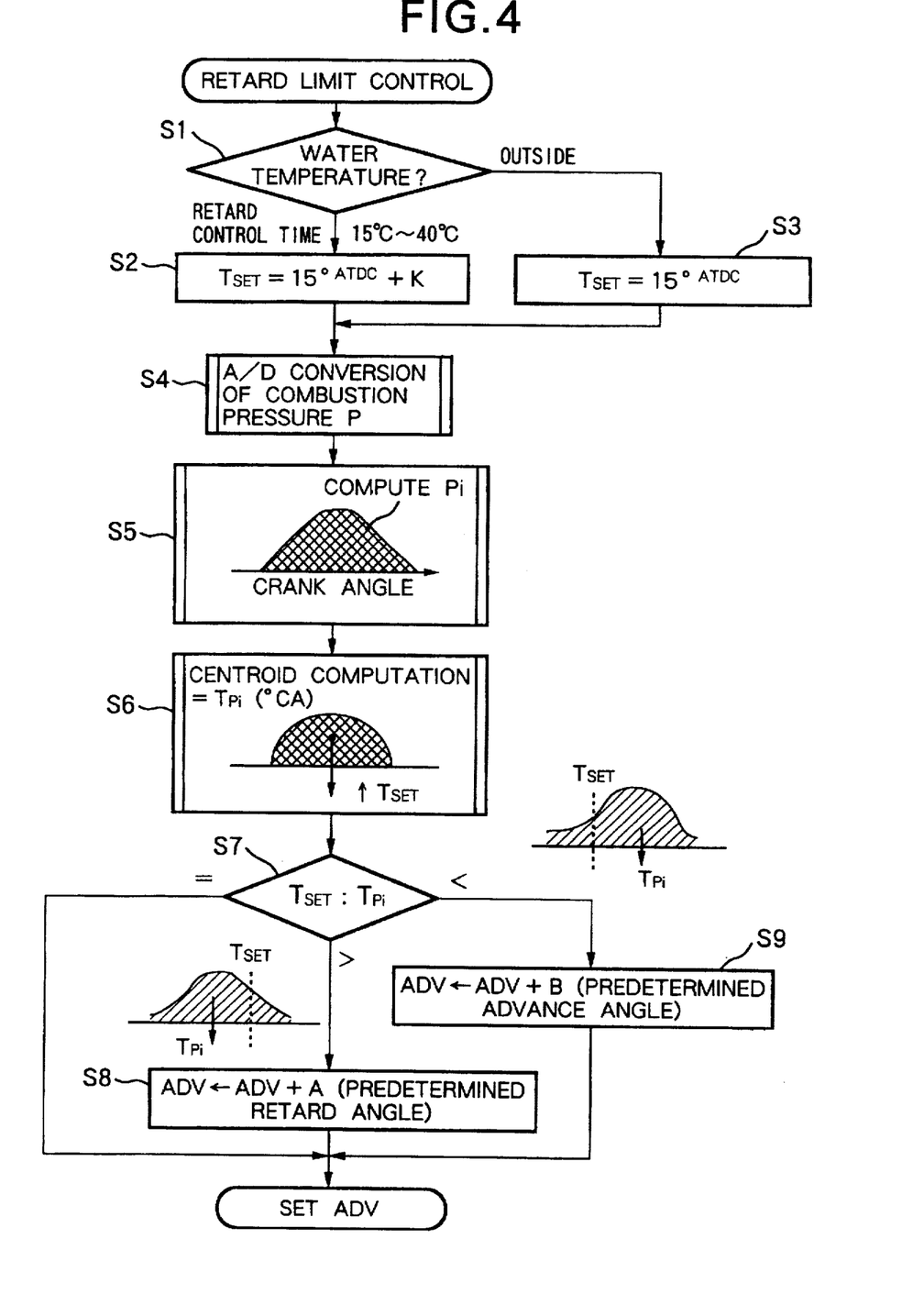
FIG. 4 is a flow chart showing an ignition timing control routine of the embodiment.
Figure 5:
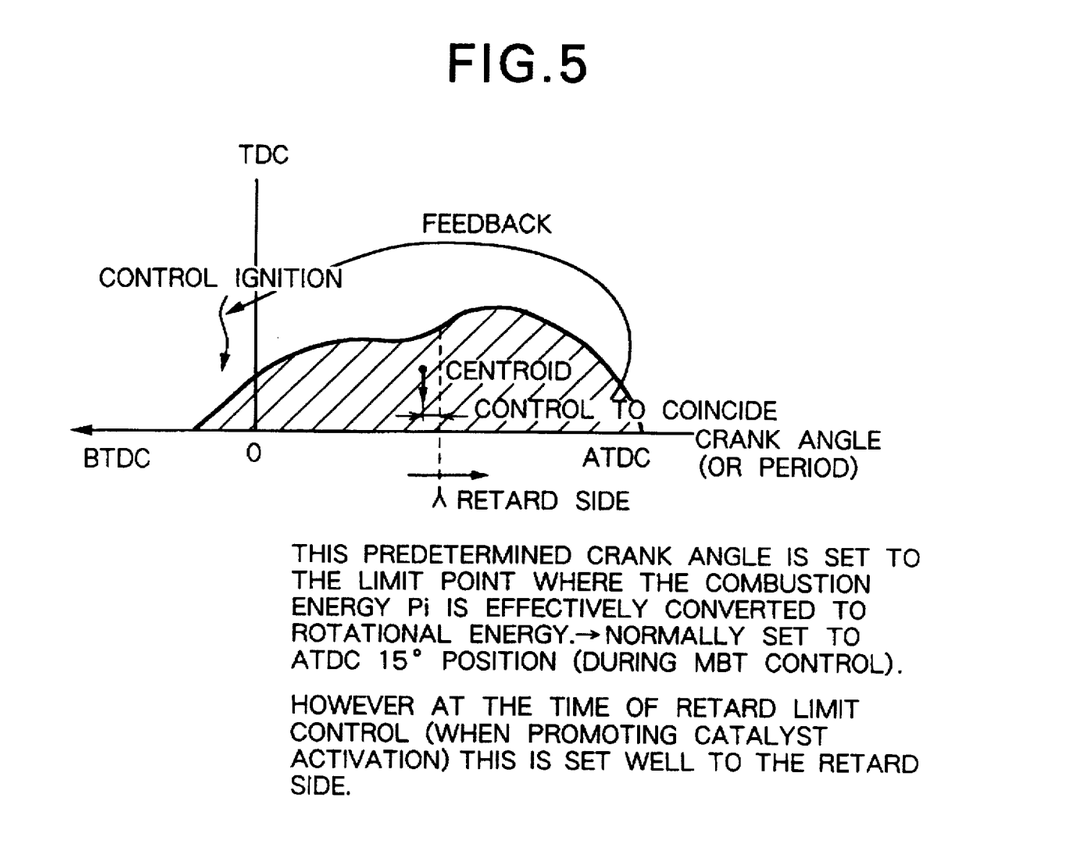
FIG. 5 is a diagram for explaining operation of the ignition timing control routine of the embodiment.

In the flow chart of FIG. 4, in step 1 (with "step" denoted by S in the figures) it is judged if the engine cooling water temperature detected by the water temperature sensor 15 is within a predetermined range (for example 15°–40° C.). If so, control proceeds to step 2 in order to carry out ignition timing retard for early stage activation of the catalytic converter. If not, control proceeds to step 3. That is to say, with the higher temperature side than the predetermined range, this is judged as a condition wherein a predetermined interval has elapsed after start-up, or there is restart, and the engine temperature is high so that the three way catalytic converter 7 is already activated (or there are conditions wherein activation is greatly facilitated). In this case, since it is not necessary to carry out retard control, control proceeds to step 3 to carry out normal control which gives priority to operability, fuel consumption and the like. Furthermore, at the time of extremely low temperatures on the lower temperature side than the predetermined range, since if retard control is carried out, operability (combustion stability) will deteriorate past the permissible limit, then in this case also retard control is not permitted, and control proceeds to step 3 to give priority to operability. Step 1 functions as the catalytic converter activation condition detecting device of the invention.

In step 2, a target centroid position crank angle $T_{SET}$ is set to 15 (deg. ATDC)+K to carry out retard control of the ignition timing in order to promote activation of the catalytic converter. $T_{SET}$=15 (deg. ATDC) is one example for where the MBT (Minimum ignition advance for Best Torque) is obtained. K indicates the retard angle setting amount limit on the ATDC side (after top dead center). The target centroid position crank angle $T_{SET}$, and K are desirable values set for each engine, and for each operating condition. Here the target centroid position crank angle $T_{SET}$ is a value which has been verified beforehand, for example by experiment. It is the crank angle corresponding to a centroid position of a generated pattern of the indicated mean effective pressure during the combustion period, obtained when the ignition timing is set to the limit point.

In step 3, the target centroid position crank angle $T_{SET}$ is set for example to 15 (deg. ATDC) (by controlling to the MBT) to carry out normal ignition timing control. Here the target centroid position crank angle $T_{SET}$ is a value which has been verified beforehand, for example by experiment. It is the crank angle corresponding to a centroid position of a generated pattern of the indicated mean effective pressure during the combustion period, obtained when the ignition timing is set to the MBT.

Steps 2, 3 function as the target centroid position setting device of the present invention.

In step 4, the detection signal of the cylinder pressure sensor 10a (or 10b–10d) is A/D converted. Carrying out the steps following step 4 for each cylinder results in higher accuracy. Step 4 corresponds to the combustion pressure detecting device.

In step 5, as shown in the flow chart, the indicated mean effective pressure (Pi) is computed by a known method using the results obtained in step 4. Limiting the crank angle interval used in this Pi computation to one which is influenced by the combustion pressure (that is to say excluding the intake and exhaust stroke) is preferable from the point of view of computation time and memory capacity.

In step 6, as shown in the flow chart, the actual crank angle Tpi (deg. CA) corresponding to the centroid position of the indicated mean effective pressure (IMEP) computed in step 5 is obtained. The computation method for the centroid position may be a known method.

Steps 5, 6 correspond to the combustion centroid position detecting device of the present invention. These may be for obtaining the centroid position of the raw wave form (or the wave form after A/D conversion) of the cylinder pressure P during the combustion period, or so as to obtain a heat generation rate pattern and then obtain the centroid position thereof.

In step 7, the target centroid position crank angle $T_{SET}$ set in step 2 or step 3, and the actual centroid position crank angle Tpi are compared.

If $T_{SET}$=Tpi, then it is judged that the centroid position of the current Pi coincides with the target centroid position, and the combustion conditions conform well to the target. That is to say the target ignition timing period has been obtained. Hence the routine is terminated.

If $T_{SET}$>Tpi, then the centroid position of the current Pi is judged to be on the top dead center (TDC) side relative to the target centroid position. Hence it is judged that the target combustion condition has not yet been attained (in other words, the ignition timing has not been retarded to the target limit point). Control therefore proceeds to step 8 where the current ignition timing ADV is retarded by a predetermined retard angle amount A, and the routine terminated.

On the other hand, if $T_{SET}$<Tpi, then the centroid position of the current Pi is judged to be on the bottom dead center (BDC) side relative to the target centroid position. Hence it is judged that the target combustion condition is exceeded and combustion deteriorated (in other words, the ignition timing has been excessively retarded so that the target limit point is exceeded). Control therefore proceeds to step 9 where the current ignition timing ADV is advanced by a predetermined advance angle amount B, and the routine terminated. Here the values A and B may be the same value or may be different. However, if engine stability is to be considered, A≦B is preferable.

Step 7 corresponds to the combustion conditions detecting device of the present invention.

In this way with the present embodiment, the centroid position Tpi of the generated pattern of the indicated mean effective pressure (or the combustion pressure wave form, or the heat generation rate) during the combustion period, which changes by a relatively large amount relative to the change in the combustion conditions, is detected. The detected centroid position Tpi and a previously set target centroid position $T_{SET}$ are then compared so as to detect the combustion conditions. Hence the combustion conditions of the engine can be detected to a higher accuracy than with the conventional arrangement wherein combustion conditions are detected based on fluctuations of the Pi and the like.

Moreover, since the ignition timing is feedback controlled so that the detected centroid position Tpi coincides with the target centroid position $T_{SET}$ (with ignition timing retard control for early stage catalytic converter activation after engine start-up, so that the combustion energy gives the maximum exhaust energy within a predetermined stable combustion limit, while with normal ignition timing, so that the combustion energy is effectively converted to rotation energy) then even if there is inter-engine unevenness or inter-cylinder unevenness, the target combustion conditions can be achieved to a high accuracy.

With the present embodiment, since the ignition timing retard control is carried out by the above method under low activation conditions of the catalytic converter, then for example early stage activation of the three way catalytic converter 7 can be effectively promoted after start-up. Hence it is possible to reduce the discharge of exhaust gas pollutants from an early stage after start-up.

Figure 6:
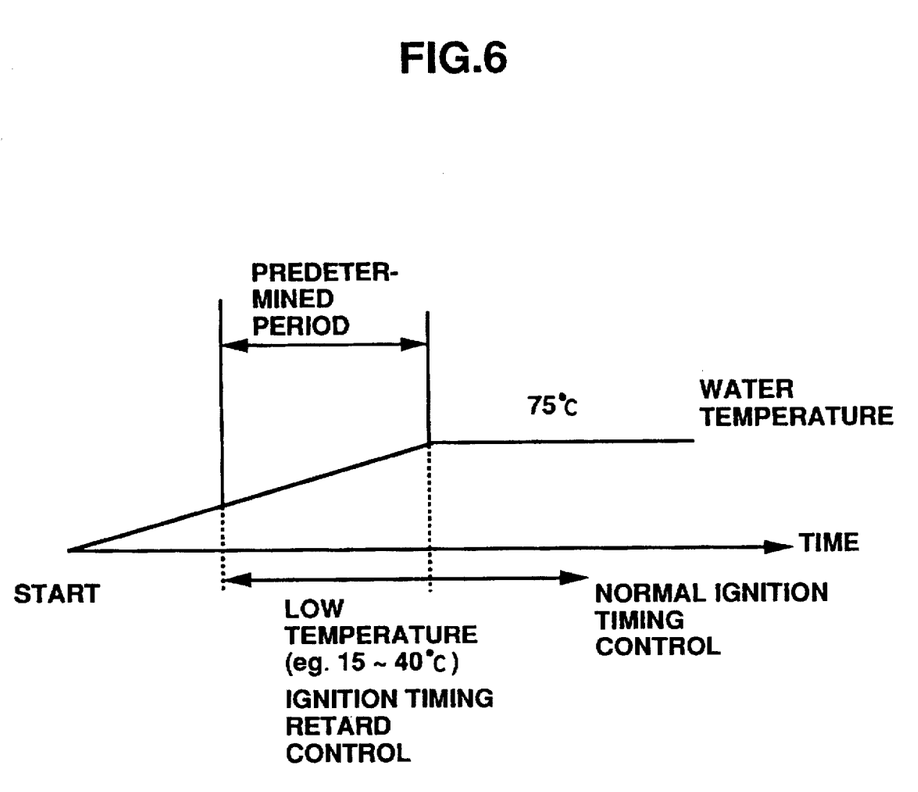
FIG. 6 is a time chart for explaining the ignition timing retard period of the embodiment.

In the present embodiment, the low activation condition of the catalytic converter is detected based on the cooling water temperature. The catalytic converter temperature may however be detected directly. Moreover, except at the time of extremely low temperatures (for example when the water temperature is below 15 degrees), the catalytic converter can be assumed to be in a low activation condition during a predetermined set period after start-up. In the case of extremely low temperatures at the time of start-up, normal control can be carried out for a predetermined period after start-up, after which ignition timing retard control can be carried out for a predetermined period (refer to FIG. 6).

With the present embodiment, the explanation has been with ignition timing representing the element for controlling the combustion conditions (since its control is comparatively simple and response is high). However, it is also possible to control for example the fuel supply quantity, fuel supply timing, intake air flow rate (in this case the fuel supply quantity is fixed), EGR quantity, purge gas quantity and the like.

I claim:

1. A method of detecting combustion conditions of an internal combustion engine comprising;
   a combustion pressure detecting step for detecting combustion pressure,
   a combustion centroid position detecting step for obtaining a crank angle position corresponding to a centroid of combustion during a combustion period as a combustion centroid position, based on said detected combustion pressure, and
   a combustion conditions detecting step for detecting combustion conditions based on said detected combustion centroid position.

2. A method of detecting combustion conditions of an internal combustion engine, wherein the combustion conditions detecting method for an internal combustion engine according to claim 1 is executed for each cylinder.

3. A method of controlling an internal combustion engine comprising;
   a combustion pressure detecting step for detecting combustion pressure,
   a combustion centroid position detecting step for obtaining a crank angle position corresponding to a centroid of combustion during a combustion period as a combustion centroid position, based on said detected combustion pressure,
   a target centroid position setting step for setting, depending on operating conditions, a crank angle position corresponding to a centroid of combustion during a combustion period for the case where desired combustion conditions are obtained, as a target centroid position, and
   an engine control quantity feedback control step for feedback controlling an engine control quantity so that said combustion centroid position becomes said target centroid position.

4. A method of controlling an internal combustion engine according to claim 3, wherein a catalytic converter activation conditions detecting step for detecting activation conditions of an exhaust gas purification catalytic converter disposed in an engine exhaust system is incorporated, and when a low activation condition of the catalytic converter is detected by said catalytic converter activation conditions detecting step, the target centroid position set by said target centroid position setting step is made to approach closer to a combustion stroke completion side than for normal times.

5. A method of controlling an internal combustion engine according to claim 3, wherein said engine control quantity is the ignition timing.

6. A method of controlling an internal combustion engine, wherein the control method for an internal combustion engine according to claim 3 is executed for each cylinder.

7. An apparatus for detecting combustion conditions of an internal combustion engine comprising;
   combustion pressure detecting means for detecting combustion pressure,
   combustion centroid position detecting means for obtaining a crank angle position corresponding to a centroid of combustion during a combustion period as a combustion centroid position, based on said detected combustion pressure, and combustion conditions detecting means for detecting combustion conditions based on said detected combustion centroid position.

8. An apparatus for detecting combustion conditions of an internal combustion engine, wherein the combustion conditions detecting apparatus for an internal combustion engine according to claim 7 is provided for each cylinder.

9. An apparatus for controlling an internal combustion engine comprising;

combustion pressure detecting means for detecting combustion pressure, combustion centroid position detecting means for obtaining a crank angle position corresponding to a centroid of combustion during a combustion period as a combustion centroid position, based on said detected combustion pressure, target centroid position setting means for setting, depending on operating conditions, a crank angle position corresponding to a centroid of combustion during a combustion period for the case where desired combustion conditions are obtained, as a target centroid position, and engine control quantity feedback control means for feedback controlling an engine control quantity so that said combustion centroid position becomes said target centroid position.

10. An apparatus for controlling an internal combustion engine according to claim 9, wherein a catalytic converter activation conditions detecting means for detecting activation conditions of an exhaust gas purification catalytic converter disposed in an engine exhaust system is incorporated, and when a low activation condition of the catalytic converter is detected by said catalytic converter activation conditions detecting means, the target centroid position set by said target centroid position setting means is made to approach closer to a combustion stroke completion side than for normal times.

11. An apparatus for controlling an internal combustion engine according to claim 9, wherein said engine control quantity is the ignition timing.

12. An apparatus for controlling an internal combustion engine, wherein the control apparatus for an internal combustion engine according to claim 9 is provided for each cylinder.

* * * * *